United States Patent
Schneider et al.

(12)

(10) Patent No.: US 10,879,700 B2
(45) Date of Patent: Dec. 29, 2020

(54) METHOD AND ASSEMBLY FOR THE LOAD MANAGEMENT OF ELECTRICAL DEVICES

(71) Applicant: beegy GmbH, Mannheim (DE)

(72) Inventors: Johanna Schneider, Mannheim (DE); Fabian Arlt, Ludwigshafen (DE)

(73) Assignee: beegy GmbH, Mannheim (DE)

( * ) Notice: Subject to any disclaimer, the term of this patent is extended or adjusted under 35 U.S.C. 154(b) by 0 days.

(21) Appl. No.: 16/629,677

(22) PCT Filed: Feb. 5, 2019

(86) PCT No.: PCT/EP2019/052687
§ 371 (c)(1),
(2) Date: Jan. 9, 2020

(87) PCT Pub. No.: WO2019/149948
PCT Pub. Date: Aug. 8, 2019

(65) Prior Publication Data
US 2020/0161861 A1     May 21, 2020

(30) Foreign Application Priority Data

Feb. 5, 2018 (EP) ..................... 18155109

(51) Int. Cl.
*H02J 3/38* (2006.01)
*H02J 3/14* (2006.01)
(Continued)

(52) U.S. Cl.
CPC ............. *H02J 3/14* (2013.01); *B60R 16/03* (2013.01); *H02J 3/322* (2020.01); *G06Q 50/06* (2013.01)

(58) Field of Classification Search
CPC ....................................................... H02J 3/14
(Continued)

(56) References Cited

U.S. PATENT DOCUMENTS

| 5,301,016 A | 4/1994 | Gehrmann |
| 2010/0060079 A1 | 3/2010 | MacLellan et al. |

(Continued)

FOREIGN PATENT DOCUMENTS

WO 2015170411 A1 11/2015

OTHER PUBLICATIONS

International Search Report and Written Opinion dated Apr. 26, 2019 (PCT/EP2019/052687).
(Continued)

*Primary Examiner* — Rexford N Barnie
*Assistant Examiner* — Dru Parries
(74) *Attorney, Agent, or Firm* — Alix, Yale & Ristas, LLP (57) ABSTRACT

The disclosure relates to a method and an assembly for load management of electrical components of a local electrical system connected to a superordinate grid via a common grid connection point. A superordinate server creates a schedule for the controlling electrical components and, if possible, transmits the schedule to a local control unit. The local control unit implements the schedule received or, if a current schedule is not available, implements a standard schedule. The grid connection point is monitored to ensure that the power does not exceed a specified power limit value. If this is the case, the schedule currently being used to control the components is modified according to a specified scheme. If the power limit value is not adhered to within a predetermined time, a monitoring device switches off the power connection of individual components in accordance with a specified scheme.

13 Claims, 2 Drawing Sheets

(51) Int. Cl.
  *H02J 3/32* (2006.01)
  *B60R 16/03* (2006.01)
  *G06Q 50/06* (2012.01)

(58) Field of Classification Search
  USPC .......................................................... 307/52
  See application file for complete search history.

(56) References Cited

U.S. PATENT DOCUMENTS

| | | |
|---|---|---|
| 2013/0320989 A1 | 12/2013 | Inoue et al. |
| 2014/0046495 A1 | 2/2014 | Magnussen et al. |
| 2016/0141874 A1 | 5/2016 | Hunt et al. |

OTHER PUBLICATIONS

Azar, Armin Ghasem et al., "Aggregated Load Scheduling for Residential Multi-Class Appliances: Peak Demand Reduction," 12th International Conference on the European Energy Market, IEEE, p. 1-6, May 19, 2015.

METHOD AND ASSEMBLY FOR THE LOAD MANAGEMENT OF ELECTRICAL DEVICES

BACKGROUND

The invention relates to a method and an assembly for the load management of electrical devices.

Electrical consumption, generating and/or storage components are typically connected together to form a local electrical system, which is connected via a common grid connection point to a superordinate grid. Thus, for example, the electrical appliances in a household can be regarded as a local electrical system, which is connected via the domestic connection to a public energy supply grid and can draw electrical power via this grid connection point. The local electrical system can also include electrical generators, such as, for example, solar panels and combined heat and power plants, or storage devices, such as a rechargeable battery for an electric vehicle or a stationary battery store, so that depending on the local consumption and the local energy generation or discharge of an energy storage device, power can also flow from the local electrical system into the superordinate grid.

In all cases, it is necessary that the power flow at the grid connection point does not exceed a maximum permissible value.

To prevent this from happening, overcurrent protection devices are known in the prior art which interrupt the conductor cable and thus the power flow in the area of the grid connection point if the power resulting from the actually existing current and the nominal voltage exceeds a fixed preset limit. Such overcurrent protection devices, such as can be found, for example, in a fuse box, must normally be reactivated manually on a regular basis after tripping. A disadvantage of this prior art is that until such a reactivation the associated local electrical system remains completely disconnected from the superordinate grid and requires manual intervention.

A local electrical system can typically contain electrical consumers, the instantaneous power consumption of which is controllable. The same applies to energy storage devices, in which a possible power infeed can additionally be controlled. Also, some electrical generators, such as combined heat and power plants, can be controlled in terms of their power infeed, while other electric generators, such as photovoltaic systems, are less controllable and their maximum power infeed depends instead on external factors, such as the effective solar radiation.

Against this background, various methods are known in the art for controlling the electrical components in a local electrical system in such a way that the grid connection point is not overloaded so that an electrical fuse located there is not triggered.

Thus, the patent DE 41 42 650 A1 discloses a load management circuit for household appliances, in which the supply cable to a household appliance is temporarily disconnected if the overall power consumption of all household appliances connected to the circuit exceeds a predefined limit value.

Document EP 2 685 269 B1 discloses a method and a system for load optimization of an electrical system, in which on the basis of an actual available amount of electric power and an identified actual consumption, a plan for the allocation of electrical energy to individual consumers is continuously updated. A disadvantage of this prior art is that the electrical system locally requires a high-performance control system which is capable of processing a large number of infeed and consumption values measured at high sampling rates sufficiently quickly that the said plan can be suitably updated to comply with limit values. In the event of an overload on the control system or other interruptions in the updating of the plan, limits can be exceeded, which may result in damage to electrical consumers or generators, but at least to a regular tripping of a fuse at the grid connection point which must then be reset manually.

SUMMARY

The object of the present invention is to provide a method and an assembly in which the known disadvantages from the prior art no longer occur, or at least only to a reduced extent.

Accordingly, the invention relates to a method for controlling a local electrical system connected to a superordinate grid via a grid connection point to adhere to a specified power limit at the grid connection point, wherein the local electrical system comprises components, at least some of which components are controllable components that are controllable in terms of their contribution to the power transmitted over the grid connection point, and a local control unit, wherein to provide local control the local control unit has a data connection to the controllable components, can connect the power connection of at least one of the components of the local electrical system to the grid connection point, and has at least a temporary data connection to a superordinate server for sending information and receiving a schedule, having the steps of:

creating a forward-looking schedule extending over a period for controlling the controllable components of the local electrical system by means of the superordinate server, wherein the forward-looking schedule is created based on one or more of (i) measured values received from the local control unit, (ii) forecast data concerning energy consumption in the local electrical system, (iii) forecast data concerning energy production in the local electrical system, (iv) forecast data concerning energy consumption in the superordinate grid, (v) forecast data concerning energy production in the superordinate grid, (vi) historical energy consumption for the components of the local electrical system, (vii) historical energy production data for the components of the local electrical system, and (viii) technical information relating to the components of the local electrical system, in such a way that upon the occurrence of the assumptions made for creating the schedule, the specified power limit value is adhered to at the grid connection point of the local electrical system;

transferring the forward-looking schedule from the superordinate server to the local control unit if a data connection exists, said forward-looking schedule saved on said local control unit, a forward-looking schedule including a desired operating state of one or more controllable components for a current point in time being a current schedule;

if a current schedule is available on the local control unit, controlling the controllable components in accordance with the current schedule using the local control unit, and, if no current schedule is available on the local control unit, controlling the controllable components of the local electrical system in accordance with a specified and locally stored standard schedule using the local control unit;

monitoring power transmitted via the grid connection point using the local control unit and upon determining that the specified power limit has been exceeded, implementing a temporary modification to the current or standard schedule on which the control is based according to a pre-defined scheme stored in the local control unit; and upon determining that the temporary modification in the current or standard schedule does not cause power transmitted via the grid connection point to fall below the specified power limit within a specified time limit, switching off the power connection to at least one component according to the pre-defined scheme.

The invention also relates to an assembly for controlling a local electrical system connected to a superordinate grid via a grid connection point, said local electrical system including electrical components at least some of which are controllable components that can be controlled in terms of their contribution to the power transmitted over the grid connection point, said assembly comprising:

a local control unit having a data connection to the controllable components and which can connect a power connection of at least one of the components to the grid connection point;

a superordinate server having at least a temporary data connection to the local control unit, said superordinate server configured to create a forward-looking schedule extending over a period of time for controlling the components of the local electrical system and transfer the forward-looking schedule to the local control unit, said forward-looking schedule is created based on one or more of (i) measured values received from the local control unit, (ii) forecast data concerning energy consumption in the local electrical system, (iii) forecast data concerning energy production in the local electrical system, (iv) forecast data concerning energy consumption in the superordinate grid, (v) forecast data concerning energy production in the superordinate grid, (vi) historical energy consumption for the components of the local electrical system, (vii) historical energy production data for the components of the local electrical system, and (viii) technical information relating to the components of the local electrical system, said superordinate server transferring the forward-looking schedule to said local control unit if a data connection to the local control unit exists, a forward-looking schedule including a desired operating state of one or more controllable components for a current point in time being a current schedule;

a sensor detecting power transmitted over said grid connection point, said sensor connected to said local control unit; and a monitoring module configured to monitor the power recorded by the sensor device and arranged to switch off the power connection to at least one component, wherein said local control unit controls the controllable components according to a current schedule received from the superordinate server, or, if no current schedule exists, according to a standard schedule, said local control unit monitoring the power recorded by the sensor device and upon determining that a specified power limit has been exceeded, to implement a temporary modification of the current or standard schedule on which the control is based according to a pre-defined scheme stored in the local control unit, and the monitoring module, upon determining that the temporary modification of the current or standard schedule does not cause the power transmitted via the grid connection to fall below the specified power limit within a specified time limit, said monitoring module switches off the power connection to at least one component according to a pre-defined scheme.

First, several terms used in connection with the invention will be explained.

The "superordinate grid" is an energy supply grid from which the local electrical system can draw electrical power and into which, if necessary, electrical power can also be supplied. The "superordinate grid" can be, for example, a public electricity grid.

The term "grid connection point" refers to the point of the local electrical system at which the electrical power can be exchanged with the superordinate grid. A local electrical system typically has only one grid connection point, which is often protected against overload by an electrical fuse.

The electrical power transmitted via the grid connection point can be determined by measurement techniques by both voltage and current intensity in the grid connection point being measured. In particular, if the superordinate grid is maintained at a specified nominal voltage sufficiently reliably, it can be sufficient to detect only the actual current intensity in the grid connection point and to link it with the specified nominal voltage to obtain the electrical power transferred via the grid connection point.

The "power limit value at the grid connection point" can, in principle, be chosen to be equal to the physically non-destructively transmissible electrical power via the grid connection point. As a rule, however, for the purpose of providing a safety margin the power limit in question will be selected below this limit. Of course, it is also possible to apply a tolerance range to the power limit in a known way. If the local electrical system also comprises energy producers or energy storage devices, so that, in principle, the local electrical system can also feed power into the superordinate grid, the power flow in just this direction is also monitored at the grid connection point via a power limit. The power limit value used here can be identical to the power limit value chosen for the power extraction from the grid. However, it is also possible to choose a different power limit for the supply of electrical power into the grid, for example, to ensure the stability of the superordinate grid. The power limit value or values can be static. However, it is also possible to vary the power limit values depending on specified parameters. Furthermore, the power limit in question is preferably stored both in the local control unit and on the superordinate server and in case of any changes is updated at both places.

A "data connection" denotes a wired or wireless connection between two elements, via which data can normally be exchanged bi-directionally. "Power connection" denotes a usually wired connection between two elements, over which electrical power can be transferred. Data and power connections can also be combined (see "Power-over-Ethernet" and "Power-line communication").

The term "server" means a logical unit and is in particular not limited to a single physical hardware unit. Rather, it is possible for the server also to be distributed over a plurality of possibly physically separate hardware units. A "superordinate server" is usually not associated with a single local control unit. Instead, a plurality of local control units can access the superordinate server and communicate with it.

A "schedule" within the meaning of the invention is a chronological list of the desired operating states of one or more electrical components over a time period, which in particular affect the power consumption or power supply of the components and thus ultimately their respective contribution to the power transferred via the grid connection. For a first component, for example, the temporal profile of the permissible power consumption can be defined, while for another component it can be specified that it should only be operated at a certain operating level in a certain period of time, and the rest of the time should be turned off. The schedule can be represented as a time series, wherein for each component times are included at which the operating state should change. The times can be formed as value pairs consisting of a unique time stamp and a parameter specifying the desired operating state of the respective component at this point in time.

A "current schedule" denotes a schedule which contains the desired operating states of one or more electrical components for the current point in time. A schedule is thus a "current schedule" if it has valid information for the desired operating states of one or more electrical components for the current time and, for example, not only for the past.

The term "coupling" here denotes the establishment of a data connection between the two units, in which to establish the data connection messages are exchanged containing information about the units and about the data connection to be established. The data connection can be set up according to any desired standards and using any available protocols.

The invention is characterized by the fact that the resource-intensive creation of a current schedule for the components of a local electrical system is not carried out by the local control unit, but rather by a superordinate server. Since the creation of a schedule for a local electrical system according to the invention must be carried out regularly but nevertheless only at discrete times, by using the superordinate server for a plurality of local electrical systems a favorable resource utilization can be achieved. In particular, however, in the invention the local control units do not need to have such powerful resources that they can create a schedule independently.

In accordance with the invention it is provided that the superordinate server generates a future-oriented schedule extending over a period of time on the basis of assumptions. This generation can incorporate a wide variety of factors which allows an estimate of the power consumption of the individual components of the local electrical system over the time period for which the schedule is created.

Thus, from the measurement data transmitted by the local control unit the virtually up to date consumption and generation values and states of charge of energy storage units can be determined and input directly into the generating process.

By appropriate storage and evaluation of these measurement data, historical energy consumption and production data can be derived which can provide information about a usage behavior of the components of the local electrical system. For example, in one example it can be read from historical energy consumption values that a user regularly operates his electric sauna on Friday nights, which can therefore be taken into account in the preparation of the schedule. In another example, a charging station for an electric vehicle is part of the local electrical system, in which it can be discerned from historical energy consumption data that on weekdays only a small recharge overnight is normally required, while the energy storage device of the electric vehicle is normally empty on weekend evenings. The higher energy demand at the weekend to recharge the electric vehicle can therefore also be taken into account in the schedule.

In creating the schedule other forecast data relating to the energy consumption or energy production in the local electrical system or in the superordinate grid can be incorporated. For example, a weather forecast for the geographical locale of the local electrical system can provide information on the expected power to be generated by a photovoltaic system as part of the local electrical system. Also, the forecast of cold weather with dense clouds can give evidence of an increased energy demand, if the local electrical system comprises components designed for heating or lighting. Furthermore, the basic level of available energy in the superordinate grid, which can be derived from the current electricity price, for example, can be taken into account. Components that consume a lot of electric power, for example, can preferably be operated during periods of low electricity prices.

Lastly, technical information about the components of the local electrical system can be input into the preparation of the schedule. This technical information can also comprise information on the maximum power generation, power consumption and/or storage capacity of a component of the local electrical system, such as information on the degree to which the respective component is controllable, for example, whether a component can only be switched on and off or else different operating levels are possible in it. Also, minimum requirements for the operation of a component can be part of this information. Thus, for example, it can be specified that the temperature of a freezer cabinet, which is transmitted to the superordinate server as a measurement value, must not exceed a defined limit, or that the power supplied to a component at a certain time of the day or in a specific operating state must not be interrupted. Part of the information on the components can also be an indication of whether the component is one that tends to operate in the background or a component that interacts directly with a user, such as a television. In the latter case a temporary shutdown might be more disruptive than in the case of a refrigerator, for example, if the latter essentially maintains the desired temperature.

On the basis of at least some of the factors mentioned, the superordinate server can prepare a forecast for the power requirement and, if applicable, the power generation, from which a schedule can be derived. The schedule is created in such a way that given adherence to the schedule and on the occurrence of the assumptions used to produce the same, at no time will the specified power limit on the grid connection point of the local electrical system be exceeded. In other words, the control of the components of a local electrical system by the superordinate server is planned in such a way that in the normal course of events no exceeding of the limit value at the grid connection point of the electrical system is to be expected.

The schedule thus created is transferred to the local control unit of the local electrical network for which it was created. If a data connection required for the transmission should be temporarily unavailable, the transmission of the schedule is attempted until such time as this schedule becomes obsolete due to a newly created schedule for the local electrical system in question, or the period for which the schedule was intended has expired.

The local control unit receives the schedule generated by the superordinate server and uses it as a basis for controlling the components of the local electrical system as a current schedule. If there is no current schedule available to the local control unit—for example, because the transmission between the superordinate server and the local control unit has been interrupted—a standard schedule stored in the local control unit itself is used to control the components. This guarantees a further operation of the local electrical system even in the case of malfunctions of the superordinate server or the data connection between the server and the local control unit.

The local control unit continues to monitor the power actually transmitted via the grid connection point and compares this against the specified power limit. If an overshoot of the limit value—for example, due to a randomly occurring, unforeseeable event—is discovered, the schedule which is currently used as a basis for the control of the components is adjusted according to a predefined scheme stored in the local control unit, until in the best case the limit value is again adhered to. The scheme comprises instructions as to the sequence in which, the nature of and/or the extent to which the power consumption or power supply of the individual components of the local electrical system should be temporarily changed in order to reduce the power flow through the grid connection point. For example, a freezer can often be switched off temporarily if the temperature in the interior does not exceed a predefined threshold, and/or the heating power of a dishwasher can be temporarily reduced. The adjustment of a predefined schedule by a scheme which is also predefined is consumes few resources, so that even a local control unit which is too poorly resourced to create schedules can readily perform the adjustment. The scheme is preferably created by the superordinate server, transmitted to the local control unit and stored there.

In addition to the described power monitoring and possibly resulting adjustment of the schedule, the power transmitted via the grid connection point is monitored, and on detecting that the specified power limit is exceeded continuously over a specified period of time, which may indicate an inadequate or not sufficiently timely adjustment of the schedule, according to a specified scheme the power connection to at least one component of the local electrical system is interrupted. This measure provides additional protection against an inadmissible violation of the power limit value for the grid connection point. In case the described adjustment of the schedule, for example due to a malfunction of the local control unit, is not carried out or not quickly enough, at least one electrical component is disconnected from the local electrical system by switching off the power connection, which means that any power consumption or supply of this component is completely prevented. The shutdown of the power connections again takes place according to a scheme in which, for example, the importance of the individual components is stored. The power connections are then switched off according to the importance of the components that are connected via them to the local electrical system.

To prevent any adverse effect on the described processes of checking whether a temporary change in the current or standard schedule does not cause the specified power limit to be undershot within a specified time, and the possible resulting shutdown of the power connection to at least one component according to a predefined scheme due to a malfunction or excessive loading during the temporary change of the current or default schedule on which the control is based, it is preferable if the above check and possible shutdown is performed by a monitoring module separate from the unit provided for modifying the schedule. The separate monitoring module in this case can be implemented separately from or as part of the local control unit, where in the latter case it is at least sufficiently logically separated from the rest of the local control unit that the negative influence of this monitoring module described is eliminated. The scheme is preferably created by the superordinate server, transmitted via the local control unit to the relevant monitoring module and stored there. Alternatively, it is possible to design the monitoring module as a purely analog circuit, the above-mentioned scheme then being specified by the wiring of the circuit.

It is also preferable if, after a coupling of a component of the local electrical system to the local control unit, the local control unit transmits the data received by the component unchanged to the superordinate server and the server is designed to read out identification features of the component contained in the data and/or, by observation of consumption or infeed figures contained in the data, to derive technical information about the component over a period of time. In coupling a component to the local control unit, the messages transmitted from the component to the local control unit to set up the data connection are forwarded to the superordinate server, which can match the information contained therein against a database in order to determine fully, purely on the basis of this information if possible, the type and/or the technical characteristics of the component. If this is not possible—for example, because there is no relevant information contained in the messages referred to or the component is unknown—it is provided that measurement data obtained over a period of time, which among other things also contribute to representing the power consumption or supply of the component in question, are evaluated by the superordinate server, in order to draw conclusions as to the type and possibly also individual technical information of the component. For example, from the measurement data it can be discerned if a component can both consume and deliver power, in which case it is probably an energy storage device. From the usual charge and discharge cycles it is also possible to deduce the capacity of the energy storage device. This computationally intensive evaluation of measurement data is also performed by the superordinate server, which is another reason why the local control unit does not need to be particularly highly resourced. Of course, it is also possible that the information regarding a component is entered, corrected and/or extended manually.

It is preferable if the local control unit and/or the superordinate server convert component-specific control commands and/or measurement or status messages into a uniform data format in real-time. On the one hand, this allows a plurality of different components, each with different control, information and/or transmission protocols, to be integrated into a local electrical system; on the other hand, the processing of the data both on the part of the superordinate server and the local control unit is simplified as a result of the standardization.

If a data connection between a component of the local electrical system and the local control unit permanently fails, it is preferable if the scheme for performing a temporary modification is adapted in such a way that the non-accessible component is no longer taken into account. In other words, in the event of a necessary adjustment of the schedule the no longer accessible component will be immediately excluded from consideration, in order to be able to achieve adherence to the power limit more quickly by bypassing this component.

The creation of the schedule by the superordinate server can be carried out at regular time intervals, wherein the time intervals are preferably less than or equal to the period covered by a schedule. This will ensure, at least if a data connection exists between the superordinate server and local control unit, that the latter can always be furnished with a current and valid schedule. Alternatively or additionally, the production of the schedule by the superordinate server can be triggered by external events. These external events can be, e.g., user inputs via an Internet-accessible interface, or new or modified consumption and/or generation data may be transferred from the local control unit which allow a recreation of the schedule, and/or there may be new or modified forecast data available, causing the assumptions to change. In all cases, having the creation of the schedule triggered by an external event ensures that the changes to be expected due to the external event are taken into account in the best possible way in the active schedule used by the local control unit.

For an explanation of the assembly according to the invention, reference is made to the foregoing statements.

BRIEF DESCRIPTION OF THE DRAWINGS

An example of the invention will now be described based on a preferred exemplary embodiment and by reference to the attached drawings. Shown are.

DETAILED DESCRIPTION

Figure 1:
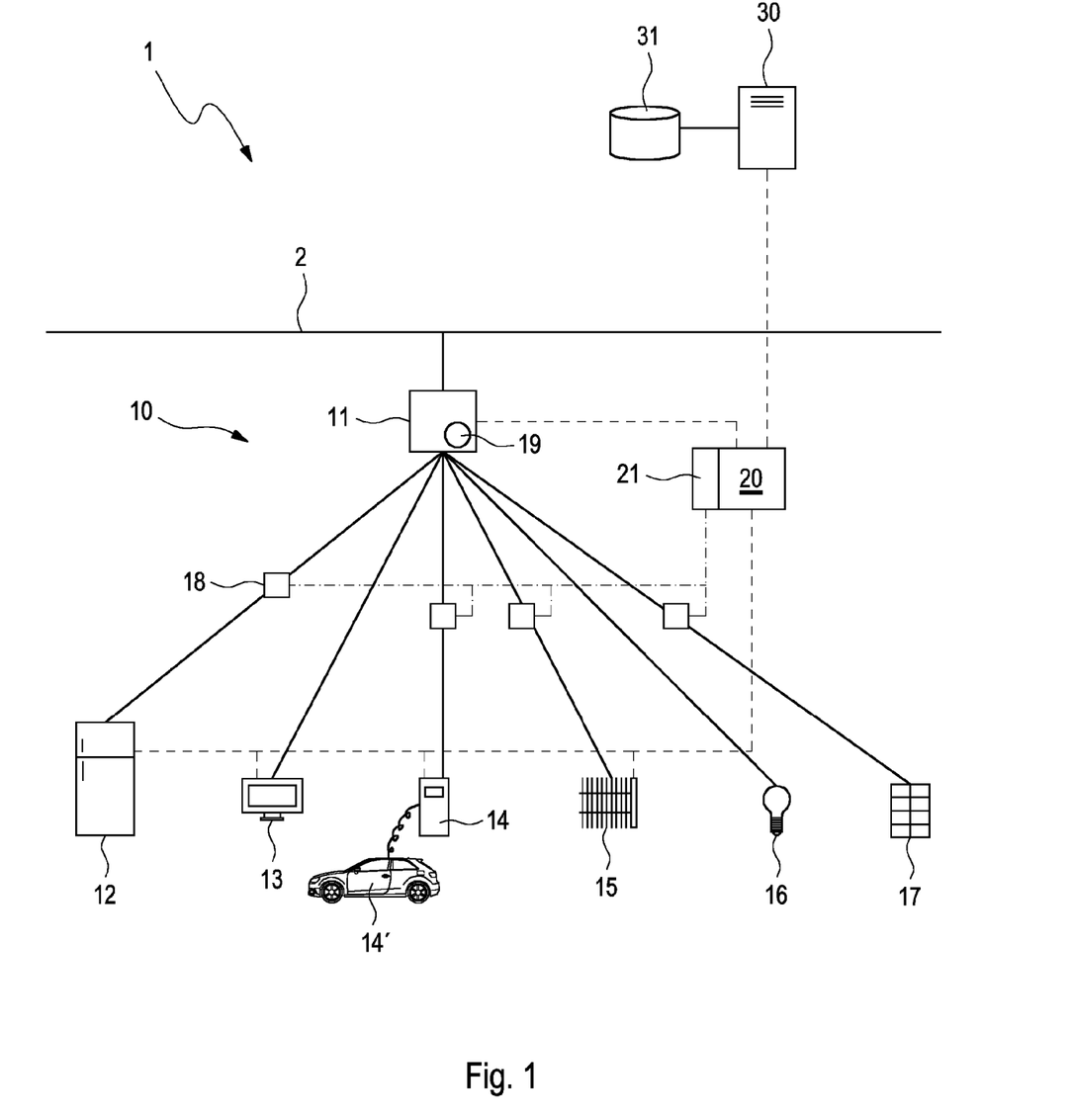
FIG. 1: a first exemplary embodiment of an assembly according to the invention for implementing the method according to the invention.

FIG. 1 shows a first exemplary embodiment of an assembly 1 according to the invention, with which the method according to the invention can be implemented.

The assembly 1 comprises a local electrical system 10, which is connected via a grid connection point 11 to a public electricity grid as a superordinate grid 2. The local electrical system 10 comprises electrical components 12-17 and a local control unit 20. In the exemplary embodiment shown, the electrical components 12-16 are firstly for a typical household electrical consumer, namely, a refrigerator 12, a television 13, an electrical heater 15 and a lighting system 16 indicated by a lamp. In addition, a charging station 14 for electric vehicles 14' is provided, with which the battery of the vehicle 14' can be charged. Via the charging station 14, the charging speed or the charging current can be controlled. In addition, the charging station 14 and the vehicle 14' are also designed to discharge a part of the power stored in the battery of a vehicle 14' connected to the charging station 14 for direct consumption in the local electrical system or for feeding into the superordinate grid 2. For a corresponding discharge process rules are stored in the charging station 14 and/or the vehicle 14' to determine whether and to what extent the vehicle 14' battery may be discharged, where these specifications can also be time-dependent.

The components 12-15 are so-called intelligent devices, i.e. they have a facility for a data connection via which control commands can at least be received, but usually also status messages, etc. can be sent. The lighting system 16, on the other hand, is conventionally designed with mechanical switches and analog lighting means (not shown).

Also part of the local electrical system 10 is a photovoltaic system 17, which is connected to the grid connection point 11, wherein the energy generated by the photovoltaic system 17 is either consumed directly by the other electrical components 11-16 of the local electrical system 10, or else can be fed into the superordinate grid 2. Even if the photovoltaic system 17 can supply the local control unit 20, if necessary, with measurement values relating to the generation of electrical power, the photovoltaic system 17 in the illustrated exemplary embodiment is not controllable, at least with regard to power generation.

The respective power connections between the components 12, 14, 15 and 17 and the grid connection point 11 each have a controllable contactor 18, with which the power connection can be optionally interrupted.

In the grid connection point 11, in addition to a possible electrical fuse (not shown), a sensor 19 is provided for detecting the current intensity present at the grid connection point 11.

The local control unit 20 has a data connection to the grid connection point 11 and, from the measurement data provided by the sensor 19 together with the nominal voltage of the grid 2, can determine the power currently flowing across the grid connection point 11.

Also, the local control unit 20 has a data connection to those components 12-15 of the local electrical system 10 that can be controlled. The controllability in this context refers in particular to the possibility of using control commands to influence the instantaneous power consumption of the components 12-15 or else the power supplied by the energy stored in the battery of the vehicle 14' via the charging station 14.

Part of the local control unit 20 is a monitoring module 21, which is connected to the contactors 18 and can control them.

The local control unit 20 is also equipped with a data connection to a superordinate server 30, for example via the Internet. The server 30 has access to a database 31, in which technical specifications of a plurality of electrical devices, historical data and information obtained from the local electrical system 10 are stored.

The operating principle of the assembly of FIG. 1 and thus the method according to the invention will now be explained on the basis of FIG. 2.

Figure 2:
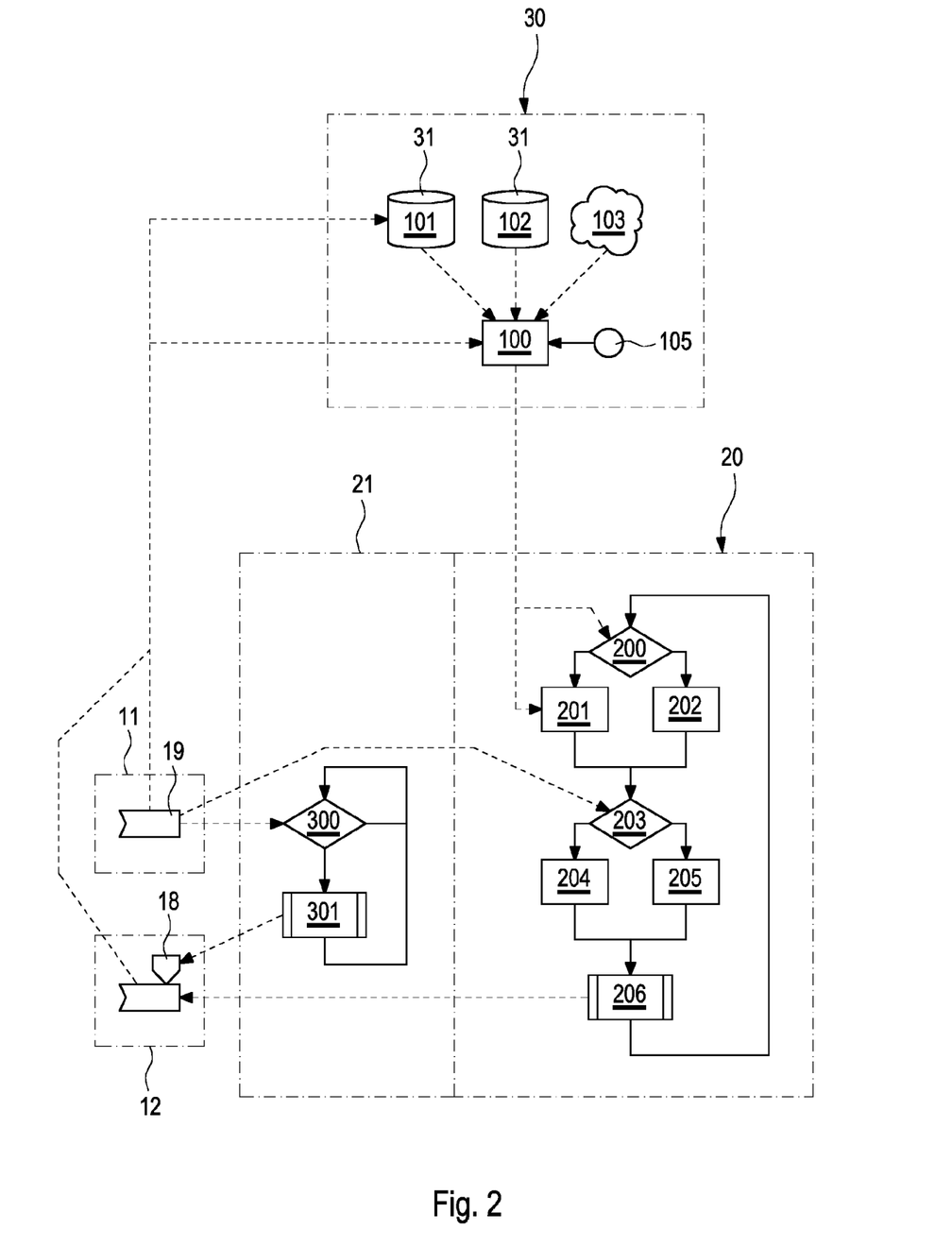
FIG. 2: a schematic representation of the method according to the invention carried out on the assembly according to FIG. 1.

The measurement values recorded by the sensor 19 at the grid connection point 11 are initially transmitted to the superordinate server 30, along with all of the data provided by the components 12-15 (of which only component 12 is shown in FIG. 2 as an example) that have a data connection to the local control unit 20. The communication for this takes place via the local control unit (see FIG. 1), which on the one side can communicate with the components 12-15 and the sensor 19 using different data protocols and transmission standards, and on the other side can communicate via the Internet with the superordinate server 30. The local control unit 20 is designed in such a way that in the presence of a data connection it transmits all received data unchanged and preferably in real-time to the superordinate server 30.

The superordinate server 30 can convert the received data that are usually available in a component-specific data format into a uniform format before the data are stored or further processed.

The data thus received and possibly converted, on the one hand, are stored in the database 31 and further processed there with other data 30 to provide historical energy consumption or energy generation data 101, from which energy consumption trends can be periodically discerned, dependent for example on such factors as time of day or day of the week, and on the other hand are incorporated directly into the production 100 of a schedule for the local electrical system 10. The production 100 of the schedule also relies on the technical information 102 stored in the database 31 relating to the components 12-17 of the local electrical system 10 and a weather forecast 103 for the location of the local electric system 10. It is also possible to take account of rules for temporarily and partially discharging the battery of a vehicle 14' connected to the charging column 14, which for this purpose are transferred to the superordinate server 30 where they are stored in the database 31. Also, any other information concerning the power production or the power consumption in the local electrical system 10, including preferences possibly specified by the user, can be taken into account in the production 100 of the schedule.

For the production 100 of the schedule, all the items of information 101-103 and the current measurement values of the sensor 19 are used to create a forward-looking schedule extending over a period of time—in this case 7.5 minutes—for controlling the components 12-15 of the local electrical system 10, the objective being that upon the occurrence of the assumptions made for creating the schedule, a specified power limit value is adhered to at the grid connection point 11 of the local system 10. The schedule contains time series for components 12-15 that can be controlled with regard to their power consumption by means of control commands from the local control unit 20.

The production 100 of the schedule is initiated by a trigger 105, which causes a regular schedule production 100 every 5 minutes and also a further production 100 if the values transmitted by the sensor 19 or the weather forecast 103 change significantly, i.e. beyond a given tolerance level.

The resulting schedule is then transmitted to the local control unit 20, provided that a suitable data connection exists.

In a first step 200 the local control unit 20 checks whether a current schedule, i.e. covering the present time, produced by the superordinate server 30 is available. If this is the case, this precise current schedule is used for the control (step 201). If there is no current schedule available—for example, because due to a malfunction the server 30 was not able to create a schedule, or at least could not transfer it to the local control unit 20—recourse is made to a standard schedule stored permanently in the local control unit 20 (step 202).

A check is then made as to whether the current power at the grid connection point 11 determined by the sensor 19 is below the specified power limit (step 203). If this is the case, the current or standard schedule identified remains unchanged (step 204). If not, the schedule is modified in accordance with a predefined scheme (step 205). In the scheme, it is stored, for example, that the cooling unit of the refrigerator 12 can be turned off for a certain period of time if the room temperature exceeds a specified limit value, or—if this is not possible or not sufficient—the energy consumption of the heater is reduced by a predefined percentage. It is also possible to store in the scheme when a charging process of the charging station 14 can be interrupted if necessary, so that the necessary power only needs to be made available at a later time, or whether a short-term lack of power can be compensated by a temporary and partial discharge of the battery of the vehicle 14' connected to the charging station 14. Only if all of the above-mentioned features were not found to be sufficient to adhere to the specified power limit value at the grid connection point 11 is the television 13 allowed to be switched off. Using the stored scheme it is possible, if necessary, to adjust the current or standard schedule so that the power limit should always be adhered to. An appropriate adjustment of the schedule may be required, for example, if the user turns on the lighting 16 at an unanticipated time.

The current or standard schedule, possibly modified as described, is used to control the components 12-15. To this end the local control unit 20 converts the information contained in the schedule into suitable control commands for the individual components 12-15 and then transmits them to the components 12-15 (step 206).

The described procedure performed by the local control unit 20 is repeated in a continuous loop, which normally ensures that the actual power at the grid connection point 11 permanently lies below the specified power limit.

However, the monitoring module 21 is additionally provided, which is constantly supplied with the measured values recorded by the sensor 19 at the grid connection point 11. The monitoring module 21 checks whether, upon the specified power limit being exceeded, the actual power is reduced to a value below the power limit within a specified time interval (step 300). If this is the case, the method of the local control unit 20 described above was successful. If not, according to a predefined scheme the contactors 18 are triggered and the power connection for individual components 12, 14, 15, 17 is therefore interrupted. The schema specifies the order in which the contactors 18 are triggered. For example, the power connection to the heating 15 can be interrupted first and only if this is not sufficient to adhere to the power limit is the power connection to the refrigerator 12 interrupted, and so on.

The monitoring module 21 can thereby ensure that even in the event of a malfunction of the local control unit 20, with regard to the method described above the specified power limit at the grid connection point 11 is adhered to.

Of course, the local control unit 20 and the monitoring module 21 not only monitor the adherence to a specified power limit value during a power flow from the superordinate grid 2 into the local electrical system 10, but also during a power flow from the local electrical system 10—in particular from the photovoltaic system 17—into the superordinate grid 2, but for which a different, lower power limit applies. To ensure adherence to the limit value, the local control unit 20 can attempt to operate the power consuming components 12-16 of the local electrical system 10 so that the power generated by the photovoltaic system 11 minus the power consumed by the components 12-16 does not exceed the specified limit value. If this is not successful or does not occur fast enough, the monitoring module 21 disconnects the photovoltaic system 17 via the contactor 18, so that the power flow into the superordinate grid 2 is prevented, while at the same time the rest of the components 12-16 can still be supplied with electrical power from the superordinate grid 2.

The invention claimed is:

1. A method for controlling a local electrical system connected to a superordinate grid via a grid connection point to adhere to a specified power limit at the grid connection point, wherein the local electrical system comprises components having a power connection to the local electrical system, at least some of which components are controllable components that can be controlled in terms of their contribution to the power transmitted over the grid connection point, and a local control unit, wherein to provide local control the local control unit has a data connection to the controllable components, can connect the power connection of at least one of the components of the local electrical system to the grid connection point, and has at least a temporary data connection to a superordinate server for sending information and receiving a schedule data, having the steps of:

creating a forward-looking schedule extending over a period for controlling the controllable components of the local electrical system by means of the superordinate server, wherein the forward-looking schedule is created based on one or more of (i) measured values received from the local control unit, (ii) forecast data concerning energy consumption in the local electrical system, (iii) forecast data concerning energy production in the local electrical system, (iv) forecast data concerning energy consumption in the superordinate grid, (v) forecast data concerning energy production in the superordinate grid, (vi) historical energy consumption for the components of the local electrical system, (vii) historical energy production data for the components of the local electrical system, and (viii) technical information relating to the components of the local electrical system, in such a way that upon the occurrence of the assumptions made for creating the schedule, the specified power limit value is adhered to at the grid connection point of the local electrical system;

transferring the forward-looking schedule from the superordinate server to the local control unit if a data connection exists, said forward-looking schedule saved on said local control unit, a forward-looking schedule including a desired operating state of one or more controllable components for a current point in time being a current schedule;

if a current schedule is available on the local control unit, controlling the controllable components in accordance with the current schedule using the local control unit, and, if no current schedule is available on the local control unit, controlling the controllable components of the local electrical system in accordance with a specified and locally stored standard schedule using the local control unit;

monitoring power transmitted via the grid connection point using the local control unit and upon determining that the specified power limit has been exceeded, implementing a temporary modification to the current or standard schedule on which the control is based according to a pre-defined scheme stored in the local control unit; and upon determining that the temporary modification in the current or standard schedule does not cause power transmitted via the grid connection point to fall below the specified power limit within a specified time limit, switching off the power connection to at least one component according to the pre-defined scheme.

2. The method of claim 1, wherein the determination as to whether a temporary change in the current or standard schedule does not cause power transmitted via the grid connection to fall below the specified power limit within a specified time limit is performed by a monitoring module separate from a unit that temporarily modifies the current or standard schedule.

3. The method of claim 1, wherein after a coupling of a component of the local electrical system to the local control unit, the local control unit transmits data received from the component unchanged to the superordinate server and the superordinate server reads out identification features of the component contained in the data or, by observation of consumption or infeed figures contained in the data, derives technical information about the component over a period of time.

4. The method of claim 1, wherein the local control unit or the superordinate server convert component-specific control commands, measurement messages, or status messages into a uniform data format in real-time.

5. The method of claim 1, wherein in the event of permanent failure of the data connection between a component of the local electrical system and the local control unit, the scheme for implementing a temporary modification is adjusted in such a way that the non-accessible component is no longer taken into account.

6. The method of claim 1, wherein, creation of the forward-looking schedule by the superordinate server is carried out at regular intervals, which are preferably less than or equal to the period covered by a forward-looking schedule, are triggered by external events such as a user input, new or modified consumption, new or modified production data, or new or modified forecast data.

7. An assembly for controlling a local electrical system connected to a superordinate grid via a grid connection point, said local electrical system including electrical components at least some of which are controllable components that can be controlled in terms of their contribution to the power transmitted over the grid connection point, said assembly comprising:

a local control unit having a data connection to the controllable components and which can connect a power connection of at least one of the components to the grid connection point;

a superordinate server having at least a temporary data connection to the local control unit, said superordinate server configured to create a forward-looking schedule extending over a period of time for controlling the components of the local electrical system and transfer the forward-looking schedule to the local control unit, said forward-looking schedule is created based on one or more of (i) measured values received from the local control unit, (ii) forecast data concerning energy consumption in the local electrical system, (iii) forecast data concerning energy production in the local electrical system, (iv) forecast data concerning energy consumption in the superordinate grid, (v) forecast data concerning energy production in the superordinate grid, (vi) historical energy consumption for the components of the local electrical system, (vii) historical energy production data for the components of the local electrical system, and (viii) technical information relating to the components of the local electrical system, said superordinate server transferring the forward-looking schedule to said local control unit if a data connection to the local control unit exists, a forward-looking schedule including a desired operating state of one or more controllable components for a current point in time being a current schedule;

a sensor detecting power transmitted over said grid connection point, said sensor connected to said local control unit; and a monitoring module configured to monitor the power recorded by the sensor device and arranged to switch off the power connection to at least one component, wherein said local control unit controls the controllable components according to a current schedule received from the superordinate server, or, if no current schedule exists, according to a standard schedule, said local control unit monitoring the power recorded by the sensor device and upon determining that a specified power limit has been exceeded, to implement a temporary modification of the current or standard schedule on which the control is based according to a pre-defined scheme stored in the local control unit, and the monitoring module, upon determining that the temporary modification of the current or standard schedule does not cause the power transmitted via the grid connection to fall below the specified power limit within a specified time limit, said monitoring module switches off the power connection to at least one component according to the pre-defined scheme.

8. The assembly of claim 7, wherein the monitoring module is integrated into the local control unit.

9. The assembly of claim 7, wherein after a coupling of a component of the local electrical system to the local control unit, the local control unit transmits data received from the component unchanged to the superordinate server and the superordinate server reads out identification features of the component contained in the data.

10. The assembly of claim 7, wherein after a coupling of a component of the local electrical system to the local control unit, the local control unit transmits data received from the component unchanged to the superordinate server by observation of consumption or infeed figures contained in the data, derives technical information about the component over a period of time.

11. The assembly of claim 7, wherein the local control unit or the superordinate server convert component-specific control commands, measurement messages, or status messages into a uniform data format in real-time.

12. The assembly of claim 7, wherein in the event of permanent failure of the data connection between a component of the local electrical system and the local control unit, the pre-defined scheme for implementing a temporary modification is adjusted in such a way that the non-accessible component is no longer taken into account.

13. The assembly of claim 7, wherein, creation of the forward-looking schedule by the superordinate server is carried out at regular intervals, which are
  preferably less than or equal to the period covered by a forward-looking schedule, are triggered by external events such as a user input, new or modified consumption, new or modified production data, or new or modified forecast data.

* * * * *